(12) United States Patent
Ohta et al.

(10) Patent No.: US 12,167,340 B2
(45) Date of Patent: Dec. 10, 2024

(54) TERMINAL DEVICE AND TRANSMISSION POWER CONTROL METHOD

(71) Applicant: FUJITSU LIMITED, Kawasaki (JP)

(72) Inventors: Yoshiaki Ohta, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 652 days.

(21) Appl. No.: 17/211,926

(22) Filed: Mar. 25, 2021

(65) Prior Publication Data
US 2021/0211985 A1    Jul. 8, 2021

Related U.S. Application Data

(63) Continuation of application No. PCT/JP2018/036147, filed on Sep. 27, 2018.

(51) Int. Cl.
| | | |
|---|---|---|
| *H04W 52/14* | (2009.01) | |
| *H04B 7/06* | (2006.01) | |
| *H04W 52/36* | (2009.01) | |
| *H04W 56/00* | (2009.01) | |
| *H04W 74/0833* | (2024.01) | |

(52) U.S. Cl.
CPC ........ *H04W 52/143* (2013.01); *H04B 7/0626* (2013.01); *H04W 52/367* (2013.01); *H04W 56/001* (2013.01); *H04W 74/0833* (2013.01)

(58) Field of Classification Search
CPC .... H04B 7/0695; H04B 7/088; H04B 7/0617; H04B 17/309; H04W 74/0833; H04W 72/23; H04W 72/046; H04W 24/10; H04W 16/28; H04W 52/325; H04W 56/001

See application file for complete search history.

(56) References Cited

U.S. PATENT DOCUMENTS

2013/0217404 A1*  8/2013  Jung ............... H04W 48/20
                                                      455/452.1
2018/0332625 A1*  11/2018  Tsai ............... H04B 7/06966
(Continued)

FOREIGN PATENT DOCUMENTS

WO       2018/164478 A1    9/2018

OTHER PUBLICATIONS

First Notification of Office Action and Search Report issued by the China National Intellectual Property Administration for Chinese Patent Application No. 201880098090.9, dated May 19, 2023, with an English translation.

(Continued)

*Primary Examiner* — Khalid W Shaheed
(74) *Attorney, Agent, or Firm* — Myers Wolin, LLC

(57) ABSTRACT

A terminal device includes: a selecting circuit configured to select a single downlink beam from among a plurality of downlink beams that are used for downlink transmission; a deciding circuit configured to decide that a radio resource associated with a synchronization signal block or a reference signal for estimating a channel state transmitted by the selected downlink beam is a radio resource that is used for a random access process; and a controller configured to control transmission power used for the decided radio resource. The controller increases the transmission power in a case in which the synchronization signal block associated with the reference signal for estimating the channel state of the selected downlink beam selected is not changed.

7 Claims, 15 Drawing Sheets

(56) References Cited

U.S. PATENT DOCUMENTS

2019/0288757 A1* 9/2019 Zhou ..................... H04B 7/155
2019/0394805 A1 12/2019 Kim et al.

OTHER PUBLICATIONS

Huawei et al.,"Random access with beam operation", Agenda Item: 10.3.1.4.2, 3GPP TSG-RAN WG2 Meeting #99bis, R2-1710771, Prague, Czech Republic, Oct. 9-13, 2017.
3GPP TS 38.321 V15.3.0, 3rd Generation Partnership Project; Technical Specification Group Radio Access Network; NR; Medium Access Control (MAC) protocol specification (Release 15), Sep. 2018.
International Search Report and Written Opinion of the International Searching Authority issued by the Japan Patent Office for corresponding International Patent Application No. PCT/JP2018/036147, mailed on Dec. 11, 2018, with an English translation.
3GPP TS 38.321 V15.3.0, 3rd Generation Partnership Project; Technical Specification Group Access Network; NR; Medium Access Control (MAC) protocol specification (Release 15), Sep. 2018.
TSG-RAN WG2, "Ls on Preamble Power Ramping Counter (Release 15)", Work Item: NR_newRAT-Core, 3GPP TSG-RAN WG2 Meeting #103, R2-1813493, Gothenburg, Sweden, Aug. 20-24, 2018.
Fujitsu, "CR to power ramping", Change Request, Work item code: NR_newRAT-Core, 3GPP TSG-RAN WG2 Meeting #103, R2-1813018, Gothenburg, Sweden, Aug. 20-24, 2018.
3GPP TS 36.133 V15.3.0, 3rd Generation Partnership Project; Technical Specification Group Radio Access Network; Evolved Universal Terrestrial Radio Access (E-UTRA); Requirements for support of radio resource management (Release 15), Jun. 2018.
3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.
ETSI TS 136 212 V15.2.1, "LTE; Evolved Universal Terrestrial Radio Access (E-UTRA); Multiplexing and channel coding (3GPP TS 36.212 version 15.2.1 Release 15)", Jul. 2018.
3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.
3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.
ETSI TS 136 321 V15.2.0, "LTE; Evolved Universal Terrestrial Radio Access (E-UTRA); Medium Access Control (MAC) protocol specification (3GPP TS 36.321 version 15.2.0 Release 15)", Jul. 2018.
ETSI TS 136 322 V15.1.0, "LTE; Evolved Universal Terrestrial Radio Access (E-UTRA); Radio Link Control (RLC) protocol specification (3GPP TS 36.322 version 15.1.0 Release 15)", Jul. 2018.
ETSI TS 136 323 V15.0.0, "LTE; Evolved Universal Terrestrial Radio Access (E-UTRA); Packet Data Convergence Protocol (PDCP) specification (3GPP TS 36.323 V15.0.0 Release 15)", Jul. 2018.
3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.
3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.
3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.2.0, "3rd Generation Partnership Project; Technical Specification Group Radio Access Network; NR; Services provided by the physical layer (Release 15)", Jun. 2018.
3GPP TS 38.211 V15.2.0, "3rd Generation Partnership Project; Technical Specification Group Radio Access Network; NR; Physical channels and modulation (Release 15)", Jun. 2018.
3GPP TS 38.212 V15.2.0, "3rd Generation Partnership Project; Technical Specification Group Radio Access Network; NR; Multiplexing and channel coding (Release 15)", Jun. 2018.
3GPP TS 38.213 V15.2.0, "3rd Generation Partnership Project; Technical Specification Group Radio Access Network; NR; Physical layer procedures for control (Release 15)", Jun. 2018.
3GPP TS 38.214 V15.2.0, "3rd Generation Partnership Project; Technical Specification Group Radio Access Network; NR; Physical layer procedures for data (Release 15)", Jun. 2018.
3GPP TS 38.215 V15.2.0, "3rd Generation Partnership Project; Technical Specification Group Radio Access Network; NR; Physical layer measurements (Release 15)", Jun. 2018.
3GPP TS 38.300 V15.2.0, "3rd Generation Partnership Project; Technical Specification Group Radio Access Network; NR; NR and NG-RAN Overall Description; Stage 2 (Release 15)", Jun. 2018.
3GPP TS 38.321 V15.2.0, "3rd Generation Partnership Project; Technical Specification Group Radio Access Network; NR; Medium Access Control (MAC) protocol specification (Release 15)", Jun. 2018.
3GPP TS 38.322 V15.2.0, "3rd Generation Partnership Project; Technical Specification Group Radio Access Network; NR; Radio Link Control (RLC) protocol specification (Release 15)", Jun. 2018.
3GPP TS 38.323 V15.2.0, "3rd Generation Partnership Project; Technical Specification Group Radio Access Network; NR; Packet Data Convergence Protocol (PDCP) specification (Release 15)", Jun. 2018.
ETSI TS 138 331 V15.2.1, "5G; NR; Radio Resource Control (RRC); Protocol specification (3GPP TS 38.331 version 15.2.1 Release 15)", Jun. 2018.
3GPP TS 38.401 V15.2.0, "3rd Generation Partnership Project; Technical Specification Group Radio Access Network; NG-RAN; Architecture description (Release 15)", Jun. 2018.
3GPP TS 38.410 V15.0.0, "3rd Generation Partnership Project; Technical Specification Group Radio Access Network; NG-RAN; NG general aspects and principles (Release 15)", Jun. 2018.
3GPP TS 38.413 V15.0.0, "3rd Generation Partnership Project; Technical Specification Group Radio Access Network; NG-RAN; NG Application Protocol (NGAP) (Release 15)", Jun. 2018.
3GPP TS 38.420 V15.0.0, "3rd Generation Partnership Project; Technical Specification Group Radio Access Network; NG-RAN; Xn general aspects and principles (Release 15)", Jun. 2018.
3GPP TS 38.423 V15.0.0, "3rd Generation Partnership Project; Technical Specification Group Radio Access Network; NG-RAN; Xn application protocol (XnAP) (Release 15)", Jun. 2018.
3GPP TS 38.470 V15.2.0, "3rd Generation Partnership Project; Technical Specification Group Radio Access Network; NG-RAN; F1 general aspects and principles (Release 15)", Jun. 2018.
ETSI TS 138 473 V15.2.1, "5G; NG-RAN; F1 Application Protocol (F1AP) (3GPP TS 38.473 version 15.2.1 Release 15)", Jul. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.

(56) References Cited

OTHER PUBLICATIONS

3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHZ (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.
3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

* cited by examiner

FIG.3
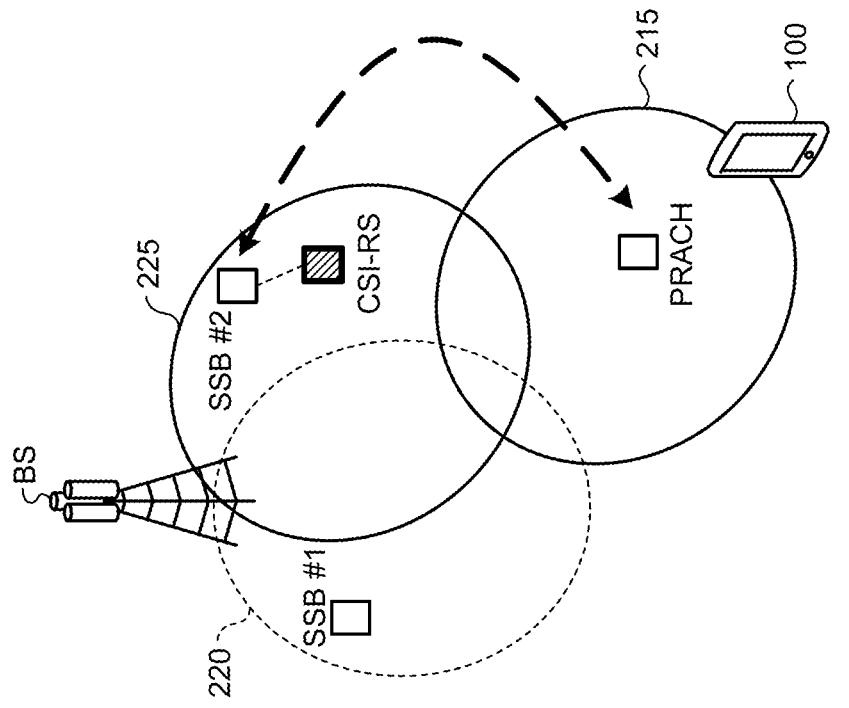
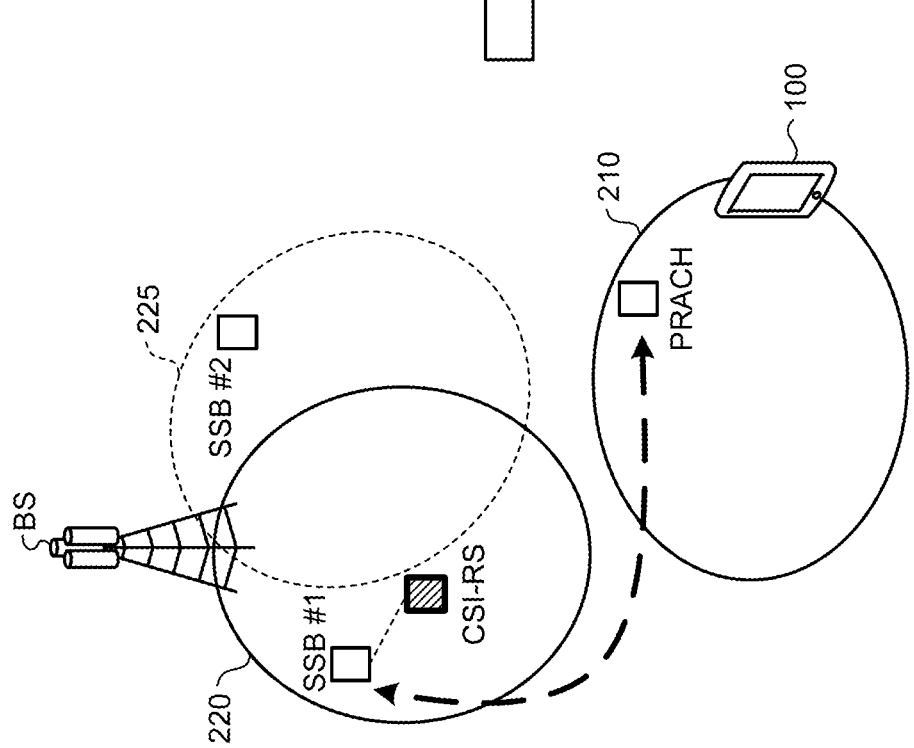

FIG.15

5.1.3 Random Access Preamble transmission

The MAC entity shall, for each Random Access Preamble:

1> if PREAMBLE_TRANSMISSION_COUNTER is greater than one; and
1> if the notification of suspending power ramping counter has not been received from lower layers; and
1> if the PRACH occasion(s) associated with SSB selected, CSI-RS selected, or SSB quasi-collocated with CSI-RS selected is not changed from ~~(i.e. same as~~ the PRACH occasion(s) in the last ~~previous~~ Random Access Preamble transmission~~)~~:

2> increment PREAMBLE_POWER_RAMPING_COUNTER by 1.

1> select the value of DELTA_PREAMBLE according to subclause 7.3;

1> set PREAMBLE_RECEIVED_TARGET_POWER to preambleReceivedTargetPower + DELTA_PREAMBLE + (PREAMBLE_POWER_RAMPING_COUNTER – 1) × PREAMBLE_POWER_RAMPING_STEP;

1> except for contention-free Random Access Preamble for beam failure recovery request, compute the RA-RNTI associated with the PRACH occasion in which the Random Access Preamble is transmitted;

1> instruct the physical layer to transmit the Random Access Preamble using the selected PRACH, corresponding RA-RNTI (if available), PREAMBLE_INDEX and PREAMBLE_RECEIVED_TARGET_POWER.

The RA-RNTI associated with the PRACH in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the specified PRACH ($0 \leq s\_id < 14$), t_id is the index of the first slot of the specified PRACH in a system frame ($0 \leq t\_id < 80$), f_id is the index of the specified PRACH in the frequency domain ($0 \leq f\_id < 8$), and ul_carrier_id is the UL carrier used for Msg1 transmission (0 for NUL carrier, and 1 for SUL carrier).

TERMINAL DEVICE AND TRANSMISSION POWER CONTROL METHOD

CROSS-REFERENCE TO RELATED APPLICATION

This application is a continuation of International Application No. PCT/JP2018/036147, filed on Sep. 27, 2018, the entire contents of which are incorporated herein by reference.

FIELD

The embodiments discussed herein are related to a terminal device and a transmission power control method.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, transportation systems, smart meters, monitoring systems for devices, and the like), there is a need to cope with services having various kinds of requirements. Thus, in the communication standards for the fifth generation mobile communication (5G or new radio (NR)), in addition to the standard technology of the fourth generation mobile communication (4G) (for example, Non-Patent Documents 1 to 11), there is a demand for a technology that implements high-data-rate, high-capacity, and low-delay communication. Furthermore, regarding the fifth generation communication standards, technical studies are being conducted in 3GPP working groups (for example, TSG-RAN WG1, TSG-RAN WG2, and the like) (Non-Patent Documents 12 to 39).

In general, for example, in a wireless communication system, such as 4G or 5G, when a terminal device starts wireless communication with a base station device, synchronization between these devices is established. The establishment of synchronization is implemented by a random access process. In the random access process, a plurality of messages are transmitted and received between the terminal device and the base station device by using physical random access channels (PRACHs). The radio resources used as the PRACHs are associated with synchronization signal blocks (SSBs) that are transmitted from, for example, the base station device. Namely, for example, in 5G, the terminal device receives an SSB that includes both of a signal for synchronization, such as a primary synchronization signal (PSS) and a secondary synchronization signal (SSS), and a physical broadcast channel (PBCH) from the base station device and performs the random access process by using the radio resource for the PRACH associated with the SSB.

Furthermore, the SSB is sometimes used to manage a transmission beam in a downlink (hereinafter, referred to as a "downlink beam") formed by the base station device. Specifically, when performing beamforming in the downlink is performed, the base station device periodically forms a plurality of downlink beams each having different directions and transmits a unique SSB by using each of the downlink beams. The terminal device selects a downlink beam with the best reception quality and performs the random access process by using the radio resource for the PRACH associated with the SSB that is transmitted by using the selected downlink beam. Furthermore, strictly speaking, the terminal device may select any beam as long as the reception quality of the downlink beam satisfies a certain level of quality; however, in a description below, for the purpose of convenience, it is assumed that the terminal device selects the "best beam".

In this beam management, studies have been conducted on using channel state information-reference signals (CSI-RSs) instead of SSBs. The CSI-RS is a reference signal for estimating a channel state that is sometimes associated with the SSB and quasi co-located. It is assumed that the CSI-RS that has been quasi co-located with the SSB has been transmitted from the same transmission point as that of the SSB.

Non-Patent Document 1: 3GPP TS 36.133 V15.3.0 (2018 June)
Non-Patent Document 2: 3GPP TS 36.211 V15.2.0 (2018 June)
Non-Patent Document 3: 3GPP TS 36.212 V15.2.1 (2018 July)
Non-Patent Document 4: 3GPP TS 36.213 V15.2.0 (2018 June)
Non-Patent Document 5: 3GPP TS 36.300 V15.2.0 (2018 June)
Non-Patent Document 6: 3GPP TS 36.321 V15.2.0 (2018 July)
Non-Patent Document 7: 3GPP TS 36.322 V15.1.0 (2018 July)
Non-Patent Document 8: 3GPP TS 36.323 V15.0.0 (2018 July)
Non-Patent Document 9: 3GPP TS 36.331 V15.2.2 (2018 June)
Non-Patent Document 10: 3GPP TS 36.413 V15.2.0 (2018 June)
Non-Patent Document 11: 3GPP TS 36.423 V15.2.0 (2018 June)
Non-Patent Document 12: 3GPP TS 36.425 V15.0.0 (2018 June)
Non-Patent Document 13: 3GPP TS 37.340 V15.2.0 (2018 June)
Non-Patent Document 14: 3GPP TS 38.201 V15.0.0 (2017 December)
Non-Patent Document 15: 3GPP TS 38.202 V15.2.0 (2018 June)
Non-Patent Document 16: 3GPP TS 38.211 V15.2.0 (2018 June)
Non-Patent Document 17: 3GPP TS 38.212 V15.2.0 (2018 June)
Non-Patent Document 18: 3GPP TS 38.213 V15.2.0 (2018 June)
Non-Patent Document 19: 3GPP TS 38.214 V15.2.0 (2018 June)
Non-Patent Document 20: 3GPP TS 38.215 V15.2.0 (2018 June)
Non-Patent Document 21: 3GPP TS 38.300 V15.2.0 (2018 June)
Non-Patent Document 22: 3GPP TS 38.321 V15.2.0 (2018 June)
Non-Patent Document 23: 3GPP TS 38.322 V15.2.0 (2018 June)
Non-Patent Document 24: 3GPP TS 38.323 V15.2.0 (2018 June)
Non-Patent Document 25: 3GPP TS 38.331 V15.2.1 (2018 June)
Non-Patent Document 26: 3GPP TS 38.401 V15.2.0 (2018 June)
Non-Patent Document 27: 3GPP TS 38.410 V15.0.0 (2018 June)

Non-Patent Document 28: 3GPP TS 38.413 V15.0.0 (2018 June)
Non-Patent Document 29: 3GPP TS 38.420 V15.0.0 (2018 June)
Non-Patent Document 30: 3GPP TS 38.423 V15.0.0 (2018 June)
Non-Patent Document 31: 3GPP TS 38.470 V15.2.0 (2018 June)
Non-Patent Document 32: 3GPP TS 38.473 V15.2.1 (2018 July)
Non-Patent Document 33: 3GPP TR 38.801 V14.0.0 (2017 March)
Non-Patent Document 34: 3GPP TR 38.802 V14.2.0 (2017 September)
Non-Patent Document 35: 3GPP TR 38.803 V14.2.0 (2017 September)
Non-Patent Document 36: 3GPP TR 38.804 V14.0.0 (2017 March)
Non-Patent Document 37: 3GPP TR 38.900 V15.0.0 (2018 June)
Non-Patent Document 38: 3GPP TR 38.912 V15.0.0 (2018 June)
Non-Patent Document 39: 3GPP TR 38.913 V15.0.0 (2018 June)

Incidentally, in the beam management performed by using the SSB or the CSI-RS, when the terminal device selects the best downlink beam, in some cases, the random access process is performed with controlling transmission power of the terminal device. Specifically, in a case in which the SSB associated with the PRACH is not changed because, for example, the selected downlink beam is not changed, the terminal device increases the transmission power of the PRACH and, in a case in which the SSB associated with the PRACH has been changed because the selected downlink beam has been changed, the terminal device maintains the transmission power of the PRACH.

However, there is a problem in that a method for controlling the transmission power is not always clear depending on an association relationship about whether the SSB or the CSI-RS is associated with the PRACH, or whether the CSI-RS is quasi co-located with the SSB. For example, in general, the CSI-RS to be quasi co-located with the SSB is transmitted by using the same downlink beam as that used by the SSB; however, in some cases, the CSI-RS is quasi co-located with another SSB that is transmitted by a downlink beam that is different from own beam. In this case, it is difficult for the terminal device to clearly decide whether to increase or maintain the transmission power of the PRACH, and thus, in some cases, the terminal device needlessly increase the transmission power or maintain the transmission power instead of increasing the transmission power that is needed to be increased. As a result, there is a problem in that an increase in interference or delay in establishment of synchronization occurs.

SUMMARY

According to an aspect of an embodiment, a terminal device includes: a selecting circuit configured to select a single downlink beam from among a plurality of downlink beams that are used for downlink transmission; a deciding circuit configured to decide that a radio resource associated with a synchronization signal block or a reference signal for estimating a channel state transmitted by the selected downlink beam is a radio resource that is used for a random access process; and a controller configured to control transmission power used for the decided radio resource. The controller increases the transmission power in a case in which the synchronization signal block associated with the reference signal for estimating the channel state of the selected downlink beam is not changed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a specific example of transmission power control according to the first embodiment;
FIG. 15 is a diagram illustrating an example of description of content according to an embodiment into the standard specifications.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
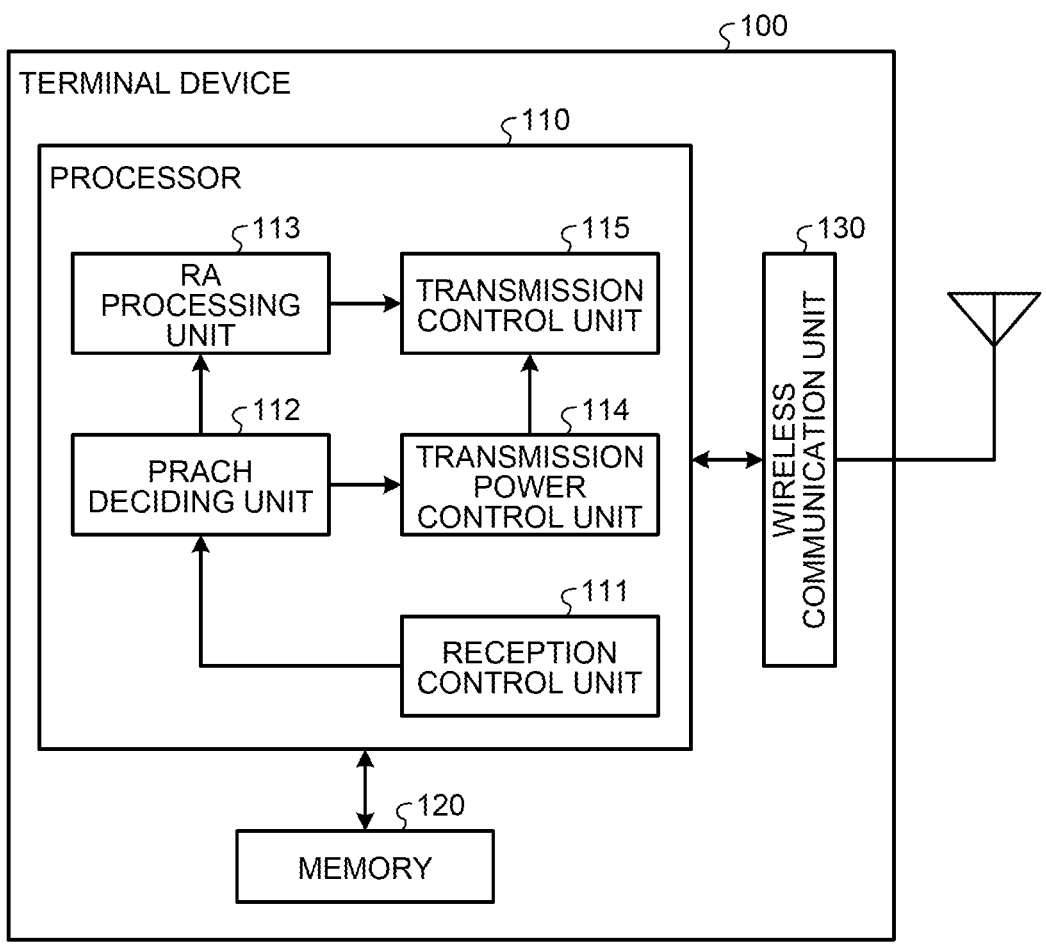
FIG. 1 is a block diagram illustrating a configuration of a terminal device according to a first embodiment.

FIG. 1 is a block diagram illustrating a configuration of a terminal device 100 according to a first embodiment. The terminal device 100 illustrated in FIG. 1 includes a processor 110, a memory 120, and a wireless communication unit 130. Furthermore, the "terminal device" can be reworded into wording of, for example, a communication device, a transmission device, a receiving device, or the like.

The processor 110 includes, for example, a Central Processing Unit (CPU), a field programmable gate array (FPGA), a digital signal processor (DSP), or the like and performs overall control of the terminal device 100. Specifically, the processor 110 includes a reception control unit 111, a PRACH deciding unit 112, a random access processing unit (hereinafter, simply referred to as an "RA processing unit") 113, a transmission power control unit 114, and a transmission control unit 115.

The reception control unit 111 performs a reception process on the signal that has been transmitted from a base station device and that has been received by the wireless communication unit 130. Specifically, the reception control unit 111 receives a signal that is transmitted by the base station device while periodically changing a downlink beam, measures and compares reception quality of the signal in each of the downlink beams, and decides a downlink beam with the best reception quality. The reception control unit 111 decides the best downlink beam at the starting time of communication with, for example, the base station device. At this time, the reception control unit 111 decides the best downlink beam every time a transmission beam in the uplink (hereinafter, referred to as an "uplink beam") formed by, for example, the terminal device 100 is changed.

When the best downlink beam is decided by the reception control unit 111, the PRACH deciding unit 112 decides the radio resource that is used as the PRACH at the time of the random access process. Namely, the PRACH deciding unit 112 specifies the radio resource for the PRACH that is associated with the SSB or the CSI-RS transmitted by the best downlink beam.

Furthermore, whether or not to identify the radio resource for the PRACH from the CSI-RS is previously configured by, for example, radio resource control (RRC) signaling. Accordingly, in a case in which configuration has been made such that the radio resource for the PRACH is identified based on the CSI-RS, the PRACH deciding unit 112 identifies, in accordance with the configuration, the radio resource for the PRACH associated with the CSI-RS transmitted by using the best downlink beam. At this time, in a case in which the radio resource for the PRACH is not associated with the CSI-RS, the PRACH deciding unit 112 refers to the SSB that is quasi co-located by the CSI-RS and identifies the radio resource for the PRACH associated with the SSB. Whether or not the CSI-RS is quasi co-located with the SSB is previously configured by, for example, RRC signaling.

In the embodiment, a description will be mainly given of a case in which a configuration is provided so as to identify the radio resource for the PRACH based on the CSI-RS that has been quasi co-located with the SSB and in which the radio resource for the PRACH is not associated with the CSI-RS. Accordingly, the PRACH deciding unit 112 identifies the radio resource for the PRACH based on the SSB that is quasi co-located by the CSI-RS that is transmitted by the best downlink beam.

The RA processing unit 113 performs the random access process by using the PRACH decided by the PRACH deciding unit 112. Namely, the RA processing unit 113 generates a message that includes a preamble and that is transmitted by the radio resource specified by the PRACH deciding unit 112.

The transmission power control unit 114 judges, based on the SSB or the CSI-RS referred to when the PRACH has been decided by the PRACH deciding unit 112, whether the transmission power used for the PRACH is increased. Specifically, when the CSI-RS transmitted by the best downlink beam is selected, the transmission power control unit 114 judges, based on whether the SSB with which the CSI-RS is quasi co-located has been changed, whether the transmission power of the PRACH is increased. The transmission power control unit 114 judges the transmission power to be increased if the selected CSI-RS is quasi co-located with different SSBs before and after the best downlink beam is selected. Furthermore, the transmission power control unit 114 judges the transmission power to be maintained if the selected CSI-RS is quasi co-located with the same SSB before and after the best downlink beam is selected. Then, in accordance with the judgement result, the transmission power control unit 114 controls the transmission power that is used for the PRACH.

The transmission control unit 115 performs a transmission process for transmitting a message generated by the RA processing unit 113 at the transmission power controlled by the transmission power control unit 114. The transmission control unit 115 forms an uplink beam and transmits the message, but, for example, in a case in which the random access process fails, the transmission control unit 115 forms a new uplink beam and repeats transmission of the message once again from the beginning.

The memory 120 includes, for example, a random access memory (RAM), a read only memory (ROM), or the like and stores therein information that is used by the processor 110 to perform processes.

The wireless communication unit 130 performs a predetermined wireless transmission process, such as digital/analog (D/A) conversion and up-conversion, on the transmission signal output from the processor 110 and transmits the processed signal via an antenna. Furthermore, the wireless communication unit 130 receives a signal via the antenna and performs a predetermined wireless reception process, such as down-conversion and analog/digital (A/D) conversion, on the reception signal.

Figure 2:
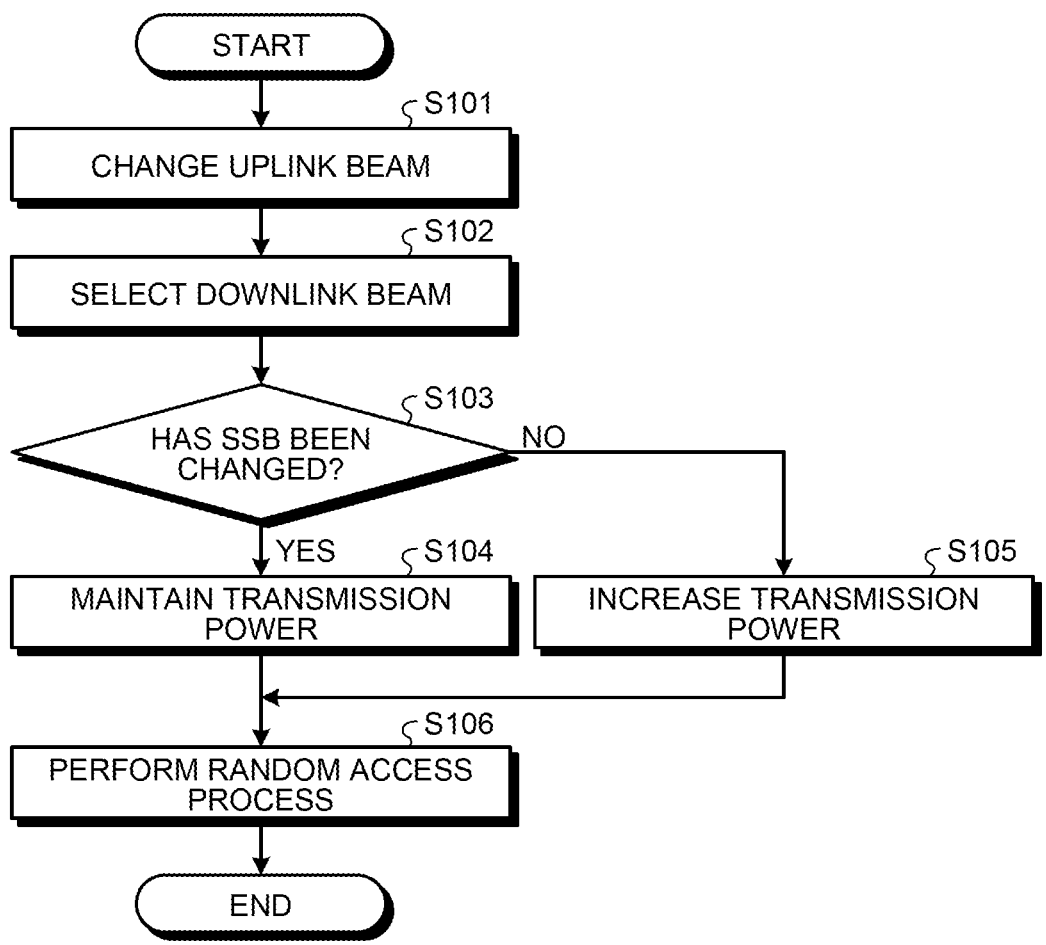
FIG. 2 is a flowchart illustrating a transmission power control method according to the first embodiment.

In the following, the transmission power control method of the PRACH performed by the terminal device 100 having configuration described above will be described with reference to the flowchart illustrated in FIG. 2.

When the random access process fails, for example, due to failure of transmitting or receiving a preamble during performing the random access process, the uplink beam is changed by the transmission control unit 115 in order to start (retry) the random access process once again from the beginning (Step S101). When the uplink beam has been changed, the CSI-RS transmitted by each of the plurality of downlink beams that are periodically formed by the base station device is received by the reception control unit 111, and the downlink beam with the best reception quality is selected (Step S102).

Then, the information related to the CSI-RSs transmitted by the selected downlink beams is notified to the PRACH deciding unit 112, and the radio resource used for the PRACH is decided by the PRACH deciding unit 112. Specifically, an attempt to specify the radio resource is performed based on the CSI-RS by the PRACH deciding unit 112; however, here, because the radio resource for the PRACH is not associated with the CSI-RS, the radio resource for the PRACH is identified based on the SSB that is quasi co-located by the CSI-RS. Namely, it is decided, by the PRACH deciding unit 112, that the radio resource associated with the SSB with which the CSI-RS is quasi co-located is the radio resource for the PRACH.

The decided radio resource for the PRACH is notified to the RA processing unit 113, and the information on the CSI-RS and the SSB that are used to decide the radio resource for the PRACH is notified to the transmission power control unit 114. Then, it is judged, by the transmission power control unit 114, whether the SSB that has been used to decide the radio resource for the PRACH has been changed before and after a change in downlink beam (Step S103). Namely, by selecting the best downlink beam, it is judged whether the SSB with which the CSI-RS is quasi co-located to be selected has been changed.

As a result of this judgement, in a case in which the SSB has been changed (Yes at Step S103), the radio resource that is used as the PRACH in accordance with a change in the SSB is also changed, and it is decided to maintain the transmission power of the PRACH because the communication state of the PRACH is highly likely to be improved (Step S104). In contrast, in a case in which the SSB is not changed (No at Step S103), the radio resource associated with the SSB is not also changed and it is thus decided to increase the transmission power of the PRACH because the communication state of the PRACH is not highly likely to be changed (Step S105).

In this way, when the uplink beam is changed and the best downlink beam is selected, whether or not to increase the transmission power is decided in accordance with whether the SSB with which the selected CSI-RS is quasi co-located has been changed. Consequently, the transmission power of the PRACH is appropriately controlled.

Incidentally, when the radio resource for the PRACH has been decided, a message or the like including a preamble that is used for the random access process is generated by the RA processing unit 113 (Step S106), and the message is mapped onto the radio resource for the PRACH. Then, the transmission power of the PRACH is set to the transmission power decided by the transmission power control unit 114, and the message is transmitted by the transmission control unit 115 via the wireless communication unit 130.

In the following, transmission power control of the PRACH according to the first embodiment will be described with specific examples. FIGS. 3 to 6 are diagrams each illustrating a specific example of the transmission power control according to the first embodiment. Each of FIGS. 3 to 6 illustrates a case in which the terminal device 100 changes an uplink beam from an uplink beam 210 illustrated on the left side of the corresponding drawings to an uplink beam 215 illustrated on the right side of the corresponding drawings. Furthermore, in each of FIGS. 3 to 6, a base station device BS periodically forms a plurality of downlink beams including downlink beams 220 and 225 and, in each of the downlink beams, a unique SSB is transmitted. CSI-RSs are quasi co-located with these SSBs.

As illustrated on the left side of each of FIGS. 3 to 6, when the terminal device 100 forms the uplink beam 210, the downlink beam 220 is selected as the best downlink beam. Furthermore, in the embodiment, the radio resource for the PRACH is associated with an SSB #1 with which the CSI-RS is quasi co-located in the selected downlink beam 220. In these drawings, the bold broken line arrows indicate association of the radio resource for the PRACH.

First, as illustrated on the right side of FIG. 3, a case is considered in which, when the terminal device 100 has changed the uplink beam to the uplink beam 215, the downlink beam 225 is selected as the best downlink beam. Here, the CSI-RS in the selected downlink beam 225 is quasi co-located with an SSB #2. Consequently, the PRACH deciding unit 112 in the terminal device 100 decides that the radio resource associated with the SSB #2 is the radio resource for the PRACH. Furthermore, because the SSB that is quasi co-located by the selected CSI-RS has been changed from the SSB #1 to the SSB #2, the transmission power control unit 114 decides to maintain the transmission power.

Figure 4:
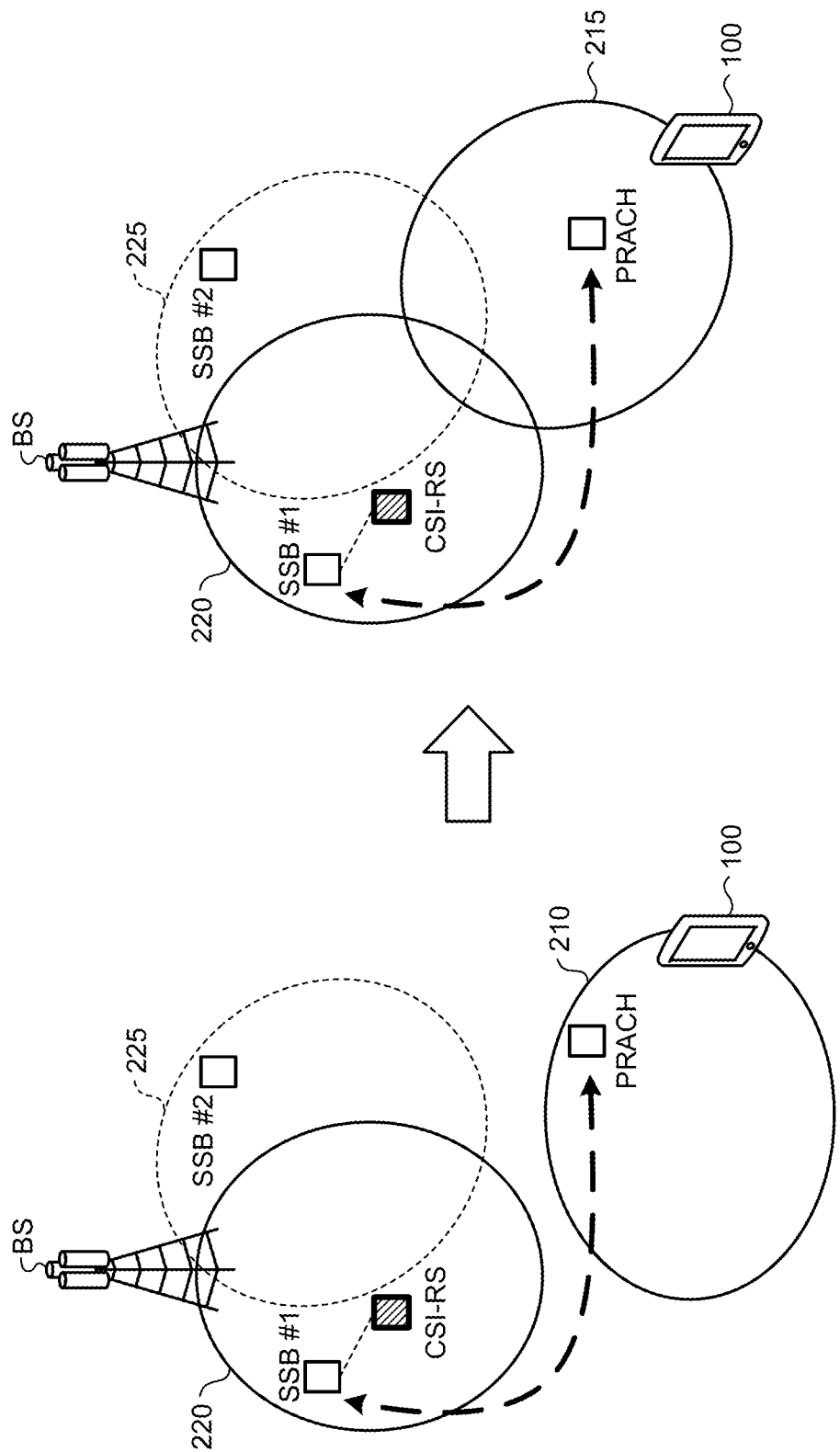
FIG. 4 is a diagram illustrating another specific example of the transmission power control according to the first embodiment.

In the following, as illustrated on the right side of FIG. 4, a case is considered in which, when the terminal device 100 has changed the uplink beam to the uplink beam 215, the downlink beam 220 is continuously selected as the best downlink beam. Here, the CSI-RS in the selected downlink beam 220 is quasi co-located with the SSB #1. Consequently, the PRACH deciding unit 112 in the terminal device 100 decides that the radio resource associated with the SSB #1 is the radio resource for the PRACH. Furthermore, because the SSB with which the selected CSI-RS is quasi co-located remains unchanged as the SSB #1, the transmission power control unit 114 decides to increase the transmission power.

Figure 5:
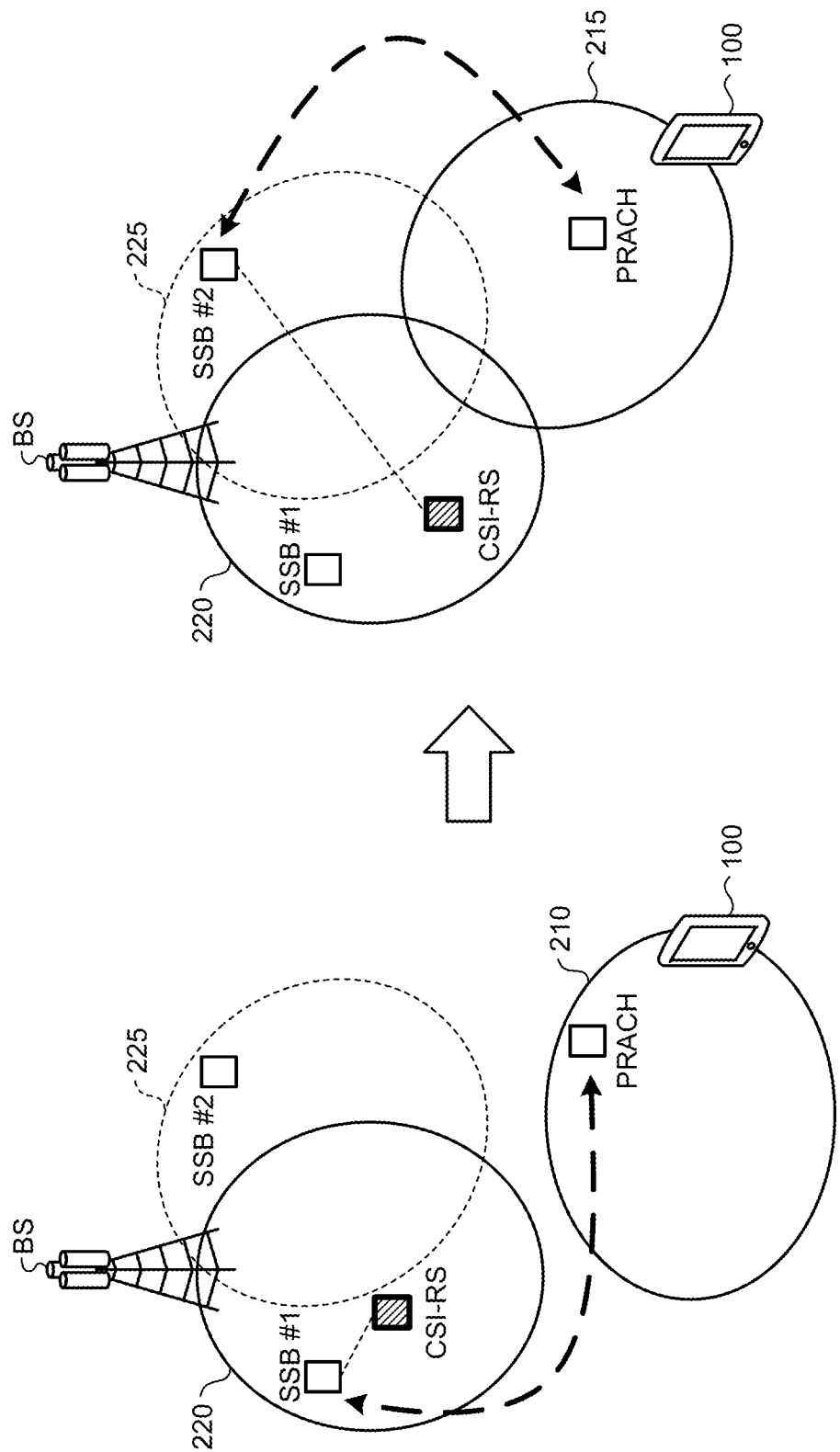
FIG. 5 is a diagram illustrating still another specific example of the transmission power control according to the first embodiment.

In the following, as illustrated on the right side of FIG. 5, a case is considered in which, when the terminal device 100 has changed the uplink beam to the uplink beam 215, the downlink beam 220 is continuously selected as the best downlink beam. Here, the CSI-RS in the selected downlink beam 220 is quasi co-located with the SSB #2. Consequently, the PRACH deciding unit 112 in the terminal device 100 decides that the radio resource associated with the SSB #2 is the radio resource for the PRACH. Furthermore, because the SSB with which the selected CSI-RS is quasi co-located is changed from the SSB #1 to the SSB #2, the transmission power control unit 114 decides to maintain the transmission power. In this way, in a case in which the SSB associated with the radio resource for the PRACH is changed even if the downlink beam to be selected is not changed, the transmission power of the PRACH is maintained because the radio resource for the PRACH is changed.

Figure 6:
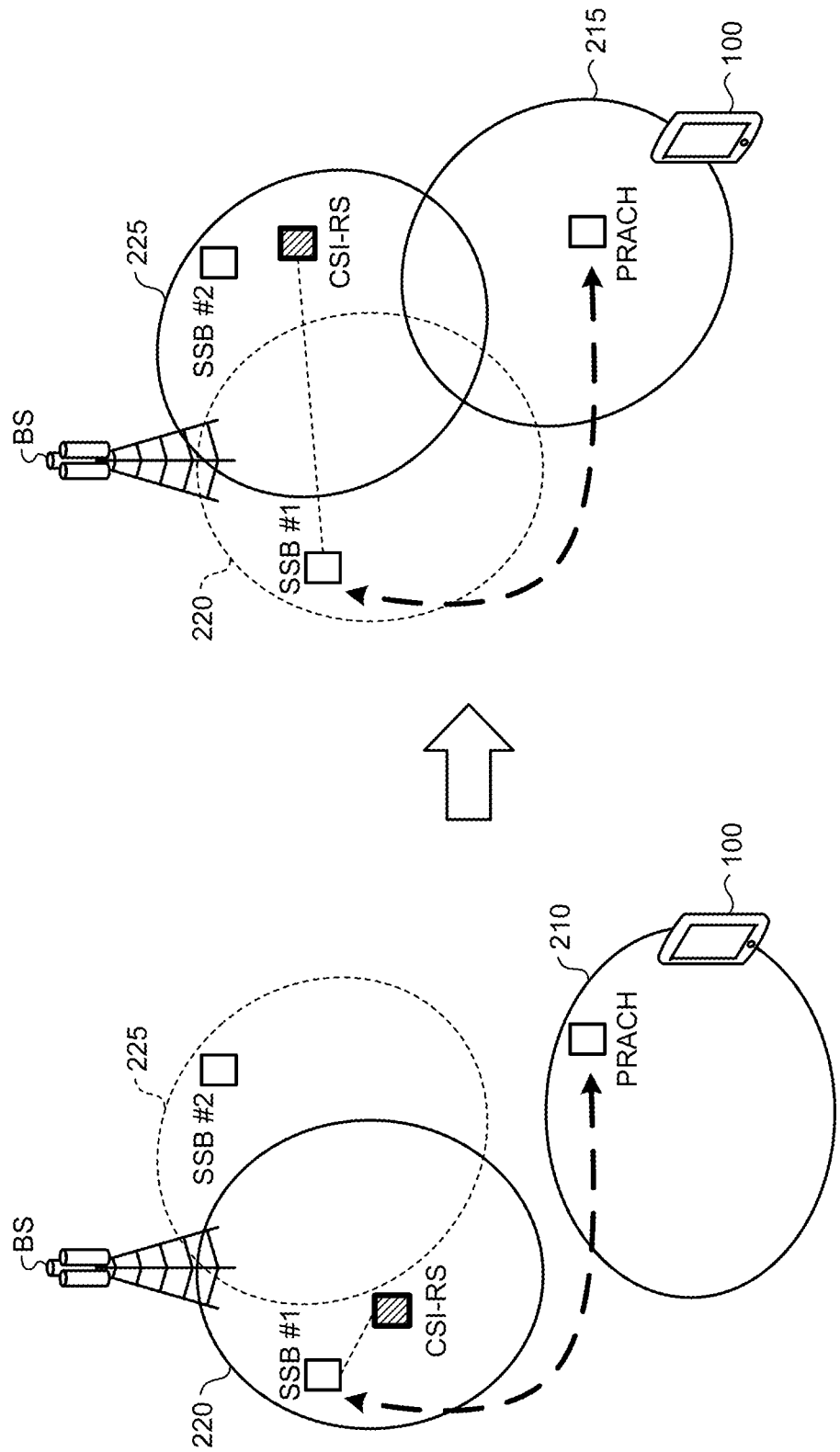
FIG. 6 is a diagram illustrating still another specific example of the transmission power control according to the first embodiment.

In the following, as illustrated on the right side of FIG. 6, a case is considered in which, when the terminal device 100 has changed the uplink beam to the uplink beam 215, the downlink beam 225 is selected as the best downlink beam. Here, the CSI-RS in the selected downlink beam 225 is quasi co-located with the SSB #1. Consequently, the PRACH deciding unit 112 in the terminal device 100 decides that the radio resource associated with the SSB #1 is the radio resource for the PRACH. Furthermore, because the SSB with which the selected CSI-RS is quasi co-located remains unchanged as the SSB #1, the transmission power control unit 114 decides to increase the transmission power. In this way, when the SSB associated with the radio resource for the PRACH is not changed even in a case in which the downlink beam to be selected is not changed, the transmission power of the PRACH is increased because the radio resource for the PRACH is not changed.

As described above, according to the embodiment, when the uplink beam is changed and the best downlink beam is selected, the transmission power of the PRACH associated with the SSB is allowed to be increased unless the SSB with which the CSI-RS is quasi co-located to be selected is changed. Consequently, in a case in which the radio resource for the PRACH is not changed and the communication state of the PRACH is not changed, the transmission power of the PRACH is increased and it is thus possible to improve a success rate of the random access process. Furthermore, when the radio resource for the PRACH is changed and the communication state of the PRACH is improved, the transmission power of the PRACH is maintained and it is thus possible to prevent an increase in unwanted interference. In other words, it is possible to achieve appropriate transmission power control.

[b] Second Embodiment

In the first embodiment described above, a description has been given of a case in which a configuration is provided so as to specify the radio resource for the PRACH based on the CSI-RS that has been quasi co-located with the SSB and in which the radio resource for the PRACH is not associated with the CSI-RS. In a second embodiment, a description will be given of a case in which a configuration is provided so as to specify the radio resource for the PRACH based on the CSI-RS that has been quasi co-located with the SSB and in which the radio resource for the PRACH is associated with the CSI-RS.

A configuration of a terminal device according to the second embodiment is the same as that of the terminal device 100 according to the first embodiment (FIG. 1); therefore, descriptions thereof will be omitted. In the second embodiment, the PRACH deciding unit 112 specifies the radio resource for the PRACH based on the CSI-RS that is transmitted by the best downlink beam. Furthermore, when the CSI-RS transmitted by the best downlink beam is selected, the transmission power control unit 114 judges, in accordance whether the CSI-RS has been changed, whether or not to increase the transmission power of the PRACH.

Figure 7:
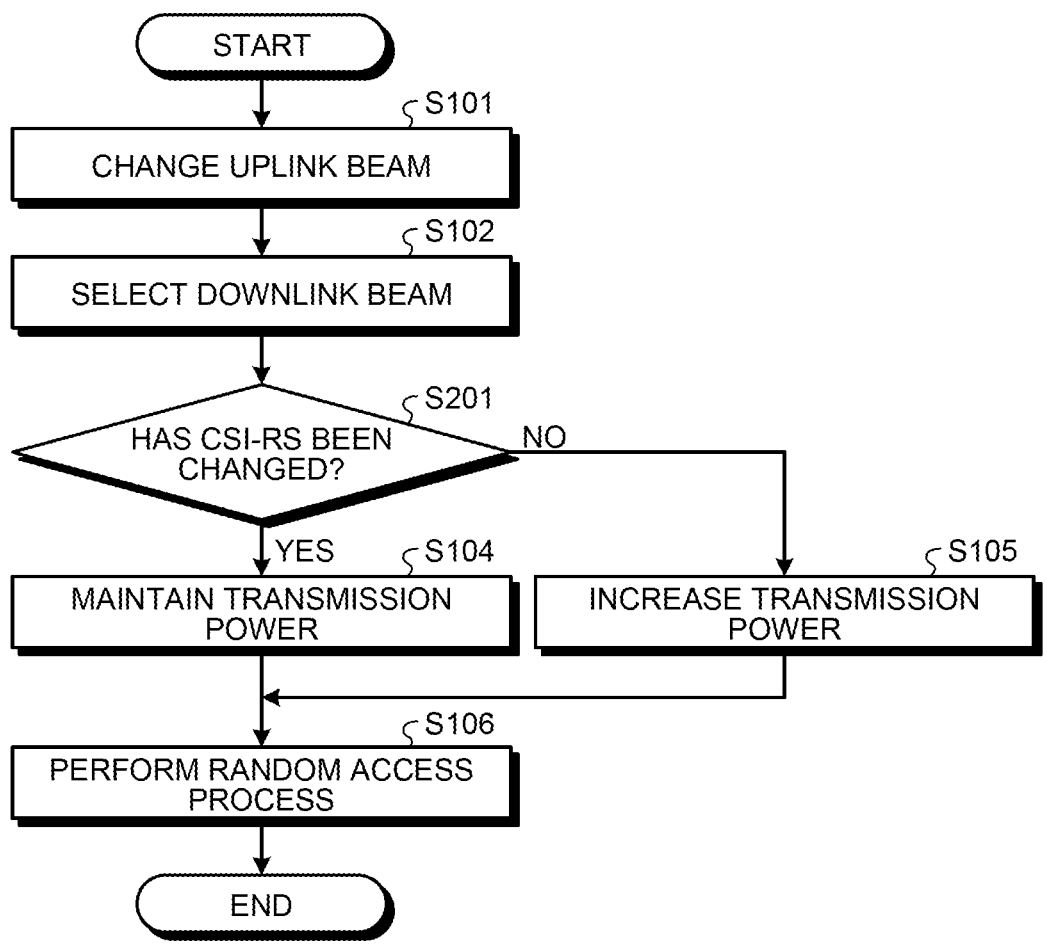
FIG. 7 is a flowchart illustrating a transmission power control method according to a second embodiment.

FIG. 7 is a flowchart illustrating a transmission power control method for a PRACH according to the second embodiment. In FIG. 7, steps that are the same as those illustrated in FIG. 2 are assigned the same reference numerals.

when the random access process fails during the random access process due to occurrence of, for example, time-out, the uplink beam is changed by the transmission control unit 115 in order to start the random access process once again from the beginning (Step S101). When the uplink beam is changed, the CSI-RS transmitted by each of the plurality of downlink beams that are periodically formed by the base station device is received by the reception control unit 111, and the downlink beam having the best reception quality is selected (Step S102).

Then, the information related to the CSI-RS transmitted by the selected downlink beam is notified to the PRACH deciding unit 112, and the radio resource that is used for the PRACH is decided by the PRACH deciding unit 112. Specifically, the radio resource is specified based on the CSI-RS by the PRACH deciding unit 112. Namely, the radio resource associated with the CSI-RS by the PRACH deciding unit 112 is decided to be the radio resource for the PRACH.

The decided radio resource for the PRACH is notified to the RA processing unit 113, and the information on the CSI-RS that has been used to decide the radio resource for the PRACH is notified to the transmission power control unit 114. Then, it is judged, by the transmission power control unit 114, whether the CSI-RS that has been used to decide the radio resource for the PRACH has been changed before or after the selection of the downlink beam (Step S201). Namely, it is judged, by selecting the best downlink beam, whether or not the CSI-RS to be selected has been changed.

As the result of this judgement, in a case in which the CSI-RS has been changed (Yes at Step S201), the radio resource that is used as the PRACH in accordance with a change in CSI-RS is also changed, and it is decided to maintain the transmission power of the PRACH because the communication state of the PRACH is highly likely to be improved (Step S104). In contrast, in a case in which the CSI-RS is not changed (No at Step S201), the radio resource associated with the CSI-RS is not also changed and it is thus decided to increase the transmission power of the PRACH because the communication state of the PRACH is not highly likely changed (Step S105).

In this way, when the uplink beam is changed and the best downlink beam is selected, whether or not to increase the transmission power is decided in accordance with whether the selected CSI-RS has been changed. Consequently, the transmission power of the PRACH is appropriately controlled.

Incidentally, when the radio resource for the PRACH is decided, a message or the like including a preamble that is used for the random access process is generated by the RA processing unit 113 (Step S106), and the message is mapped onto the radio resource for the PRACH. Then, the transmission power of the PRACH is set to the transmission power decided by the transmission power control unit 114, and the message is transmitted by the transmission control unit 115 via the wireless communication unit 130.

In the following, transmission power control of the PRACH according to the second embodiment will be described with specific examples. FIGS. 8 to 11 are diagrams each illustrating a specific example of the transmission power control according to the second embodiment. Each of FIGS. 8 to 11 illustrates a case in which the terminal device 100 changes an uplink beam from the uplink beam 210 illustrated on the left side of the corresponding drawings to the uplink beam 215 illustrated on the right side of the corresponding drawings. Furthermore, in each of FIGS. 8 to 11, a base station device BS periodically forms a plurality of downlink beams including the downlink beams 220 and 225 and, in each of the downlink beams, a unique SSB is transmitted. CSI-RSs are quasi co-located with these SSBs.

As illustrated on the left side of FIGS. 8 to 11, when the terminal device 100 forms the uplink beam 210, the downlink beam 220 is selected as the best downlink beam. Furthermore, in the embodiment, the radio resource for the PRACH is associated with the CSI-RS in the selected downlink beam 220. In these drawings, the bold broken line arrows indicate association of the radio resource for the PRACH.

Figure 8:
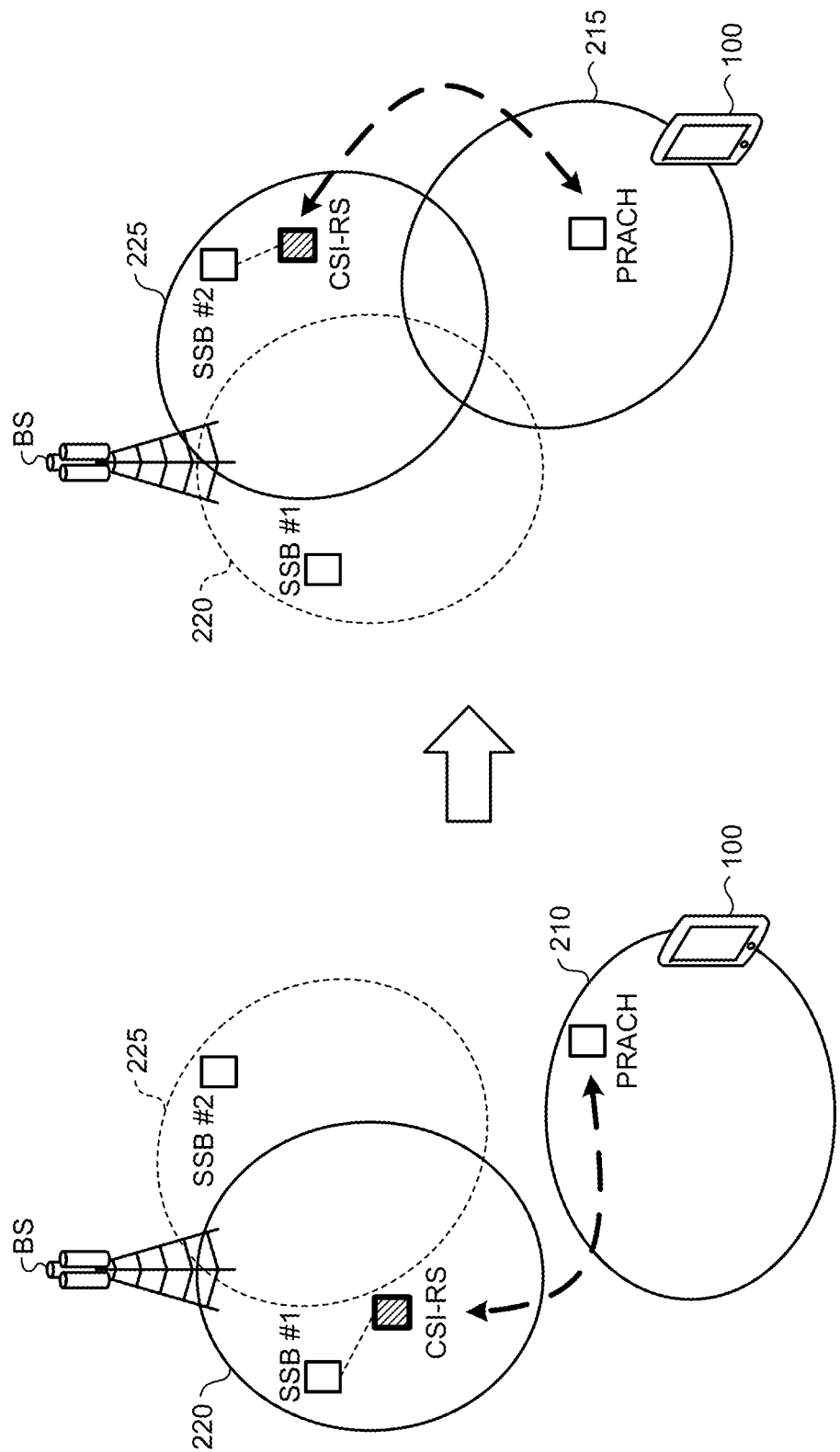
FIG. 8 is a diagram illustrating a specific example of transmission power control according to the second embodiment.

First, as illustrated on the right side of FIG. 8, a case is considered in which, when the terminal device 100 has changed the uplink beam to the uplink beam 215, the downlink beam 225 is selected as the best downlink beam. Here, in the selected downlink beam 225, the CSI-RS that has been quasi co-located with the SSB #2 is newly selected. Consequently, the PRACH deciding unit 112 in the terminal device 100 decides that radio resource associated with the newly selected CSI-RS is the radio resource for the PRACH. Furthermore, because the selected CSI-RS has been changed, the transmission power control unit 114 decides to maintain the transmission power.

Figure 9:
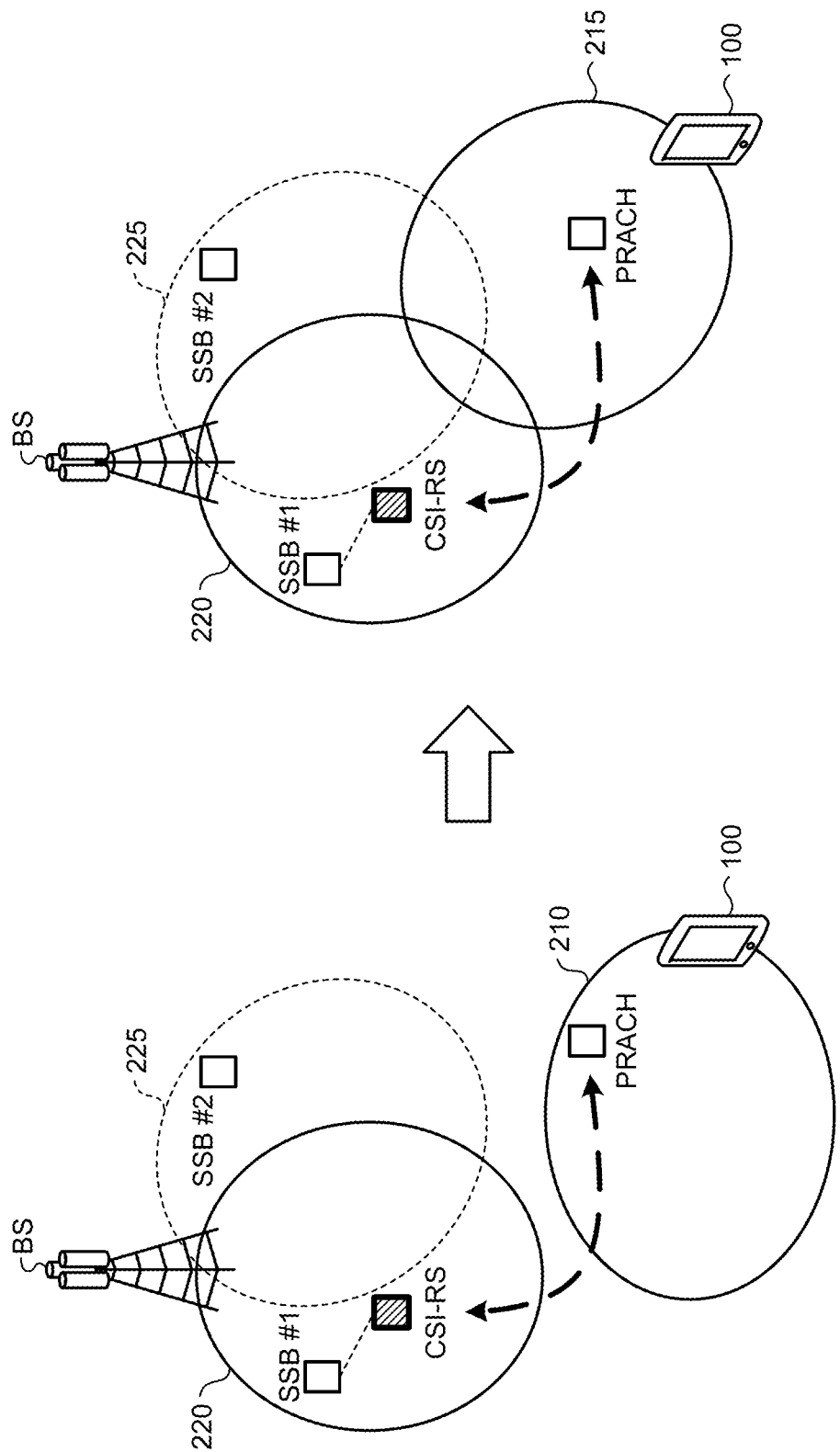
FIG. 9 is a diagram illustrating another specific example of the transmission power control according to the second embodiment.

In the following, as illustrated on the right side of FIG. 9, a case is considered in which, when the terminal device 100 has changed the uplink beam to the uplink beam 215, the downlink beam 220 is continuously selected as the best downlink beam. Here, in the selected downlink beam 220, the same CSI-RS that has been quasi co-located with the SSB #1 is selected. Consequently, the PRACH deciding unit 112 in the terminal device 100 decides that the same radio resource as that used before the change in the uplink beam is the radio resource for the PRACH. Furthermore, because the selected CSI-RS is not changed, the transmission power control unit 114 decides to increase the transmission power.

Figure 10:
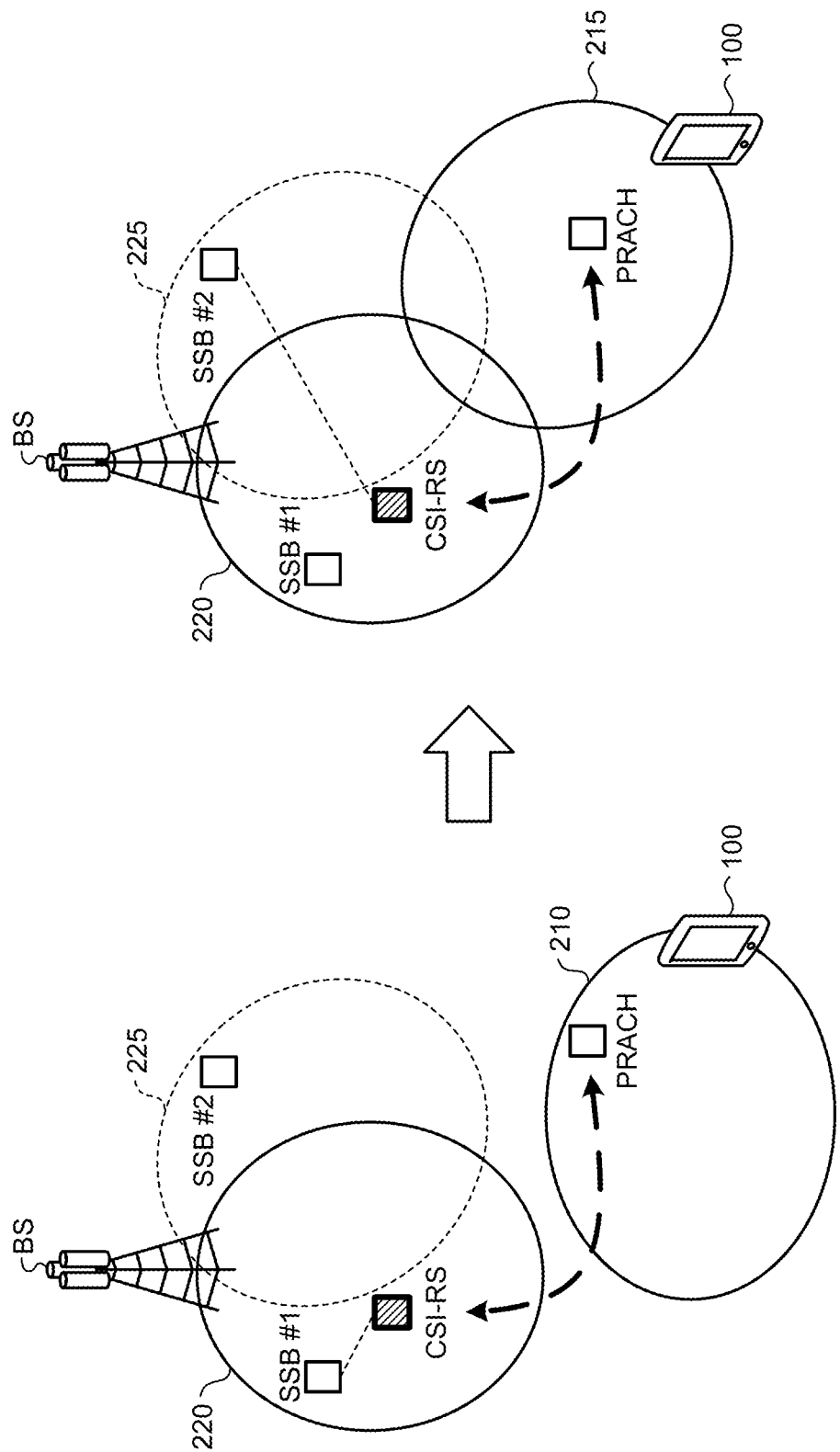
FIG. 10 is a diagram illustrating still another specific example of the transmission power control according to the second embodiment.

In the following, as illustrated on the right side of FIG. 10, a case is considered in which, when the terminal device 100 has changed the uplink beam to the uplink beam 215, the downlink beam 220 is continuously selected as the best downlink beam. Here, although the CSI-RS in the selected downlink beam 220 is quasi co-located with the SSB #2, this CSI-RS is the same CSI-RS as that used before the change in the uplink beam. Consequently, the PRACH deciding unit 112 in the terminal device 100 decides that the same radio resource as that used before the change in the uplink beam is the radio resource for the PRACH. Furthermore, because the selected CSI-RS is not changed, the transmission power control unit 114 decides to increase the transmission power. In this way, in a case in which the CSI-RS associated with the radio resource for the PRACH is not changed even if the SSB to be quasi co-located is changed, the transmission power for the PRACH is increased because the radio resource for the PRACH is not changed.

Figure 11:
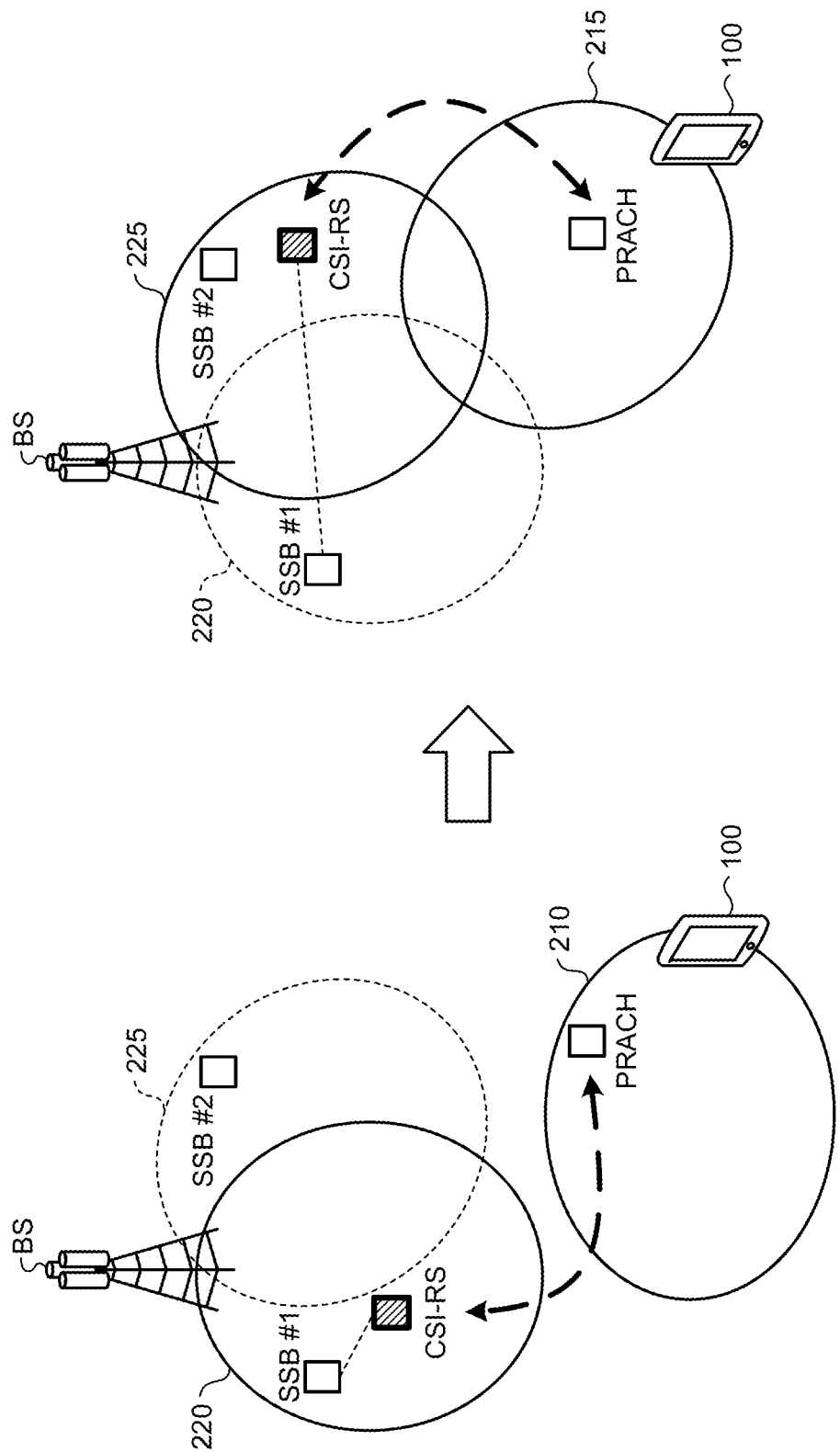
FIG. 11 is a diagram illustrating still another specific example of the transmission power control according to the second embodiment.

In the following, as illustrated on the right side of FIG. 11, a case is considered in which, when the terminal device 100 has changed the uplink beam to the uplink beam 215, the downlink beam 225 is selected as the best downlink beam. Here, in the selected downlink beam 225, the CSI-RS that has been quasi co-located with the SSB #1 is newly selected. Consequently, the PRACH deciding unit 112 in the terminal device 100 decides that the radio resource associated with the newly selected CSI-RS is the radio resource for the PRACH. Furthermore, because the selected CSI-RS has been changed, the transmission power control unit 114 decides to maintain the transmission power. In this way, in a case in which the CSI-RS associated with the radio resource for the PRACH is changed even if the SSB to be quasi co-located is not changed, the transmission power of the PRACH is maintained because the radio resource for the PRACH is changed.

As described above, according to the embodiment, when the uplink beam is changed and the best downlink beam is selected, the transmission power of the PRACH associated with the CSI-RS is allowed to be increased unless the CSI-RS to be selected is changed. Consequently, in a case in which the radio resource for the PRACH is not changed and the communication state of the PRACH is not changed, the transmission power of the PRACH is increased and it is thus possible to improve a success rate of the random access process. Furthermore, in a case in which the radio resource for the PRACH is changed and communication state of the PRACH is improved, the transmission power of the PRACH is maintained and it is thus possible to prevent an increase in unwanted interference. In other words, it is possible to achieve appropriate transmission power control.

Furthermore, in each of the embodiments described above, a description has been given with the assumption that the CSI-RS has been quasi co-located with the SSB; however, there may be a case in which the CSI-RS is not quasi co-located. Even in this case, the transmission power of the PRACH associated with the CSI-RS may also be increased unless the selected CSI-RS is changed. In the following, specific examples will be indicated.

Figure 12:
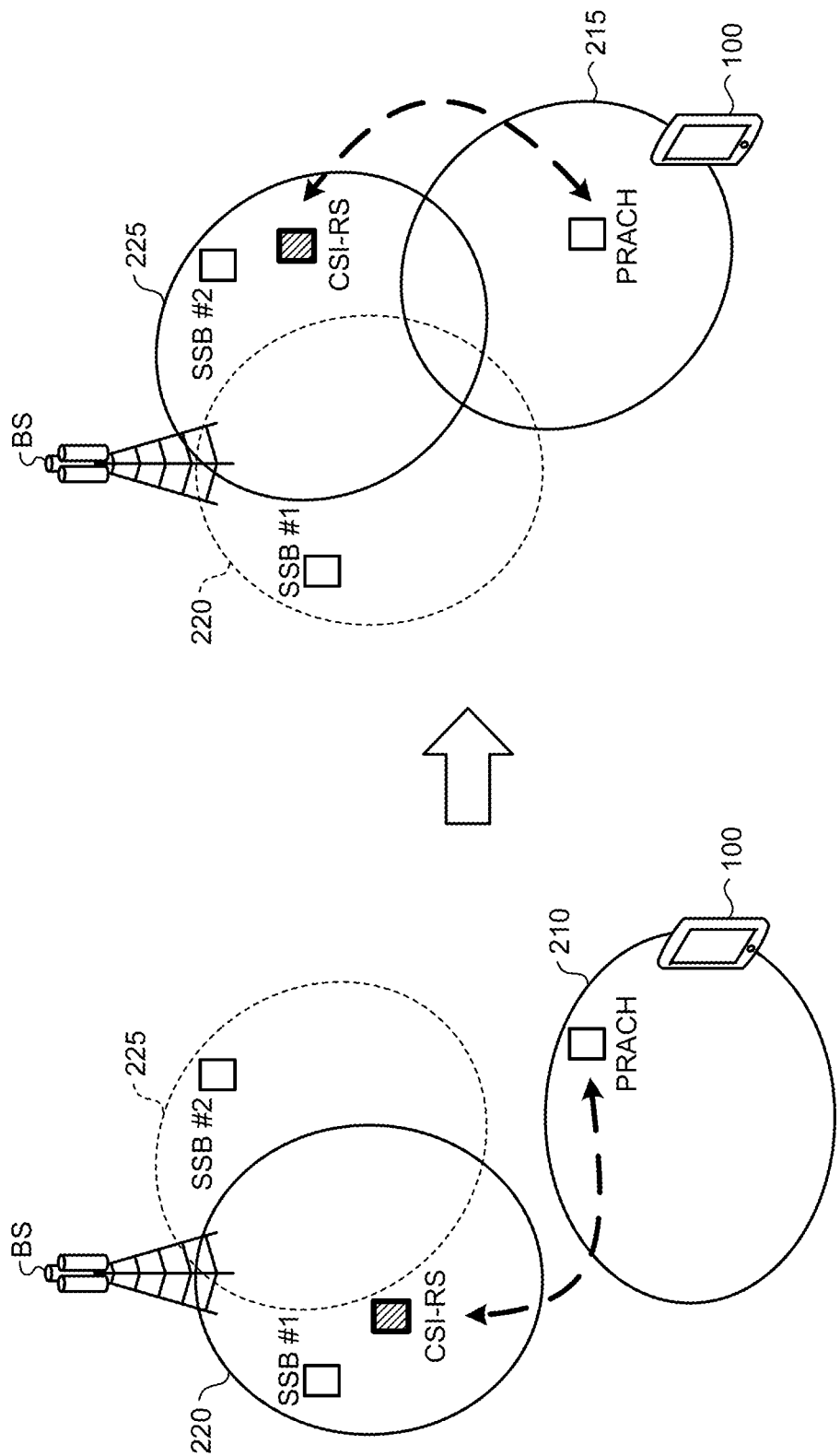
FIG. 12 is a diagram illustrating a specific example of transmission power control according to another embodiment.
Figure 13:
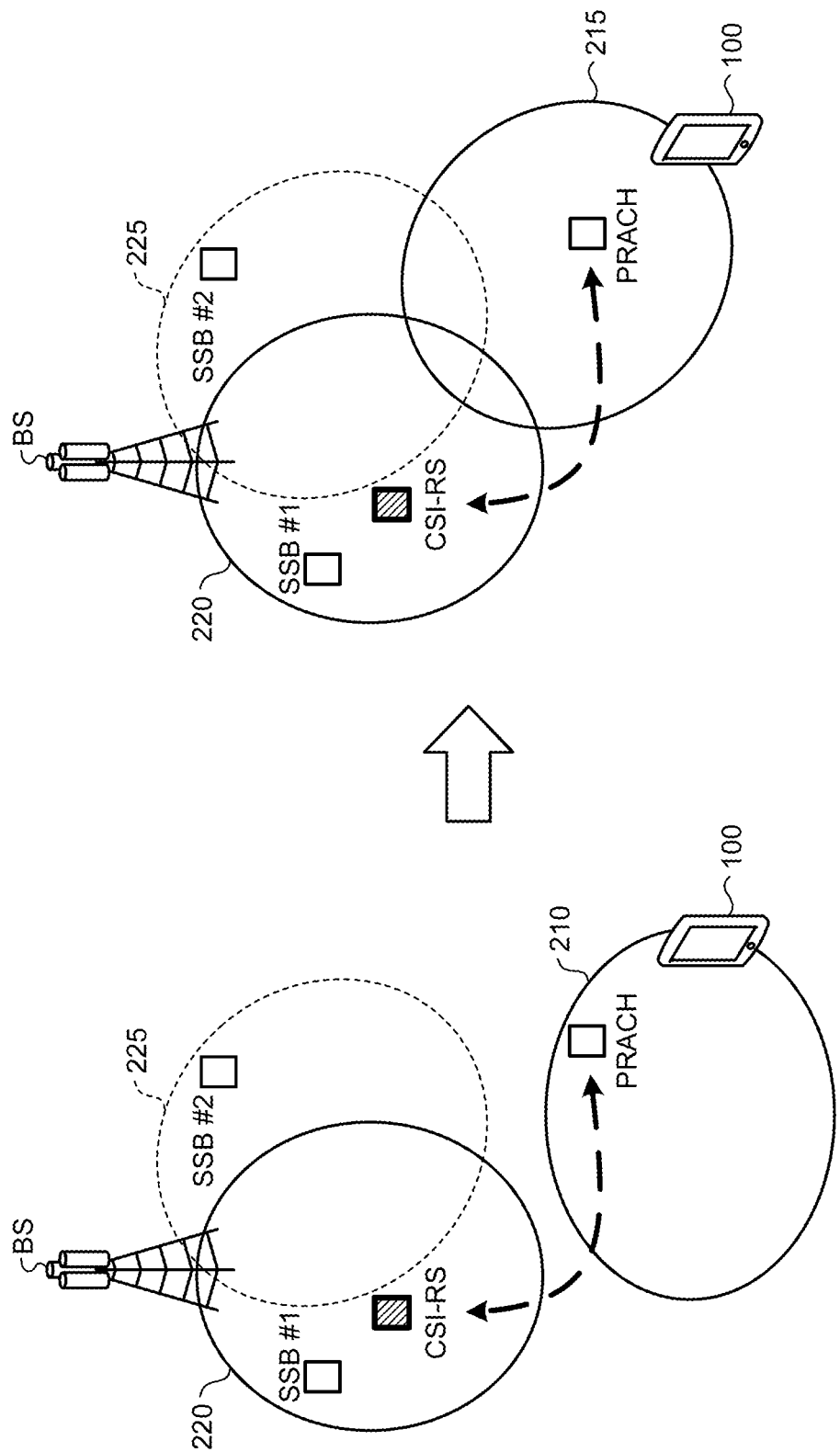
FIG. 13 is a diagram illustrating another specific example of transmission power control according to another embodiment.

FIGS. 12 and 13 are diagrams each illustrating a specific example of transmission power control according to another embodiment. Each of FIGS. 12 and 13 illustrates a case in which the terminal device 100 changes the uplink beam 210 illustrated on the left side of the corresponding drawings to the uplink beam 215 illustrated on the right side of the corresponding drawings. Furthermore, in each of FIGS. 12 and 13, a base station device BS periodically forms a plurality of downlink beams including the downlink beams 220 and 225 and, in each of the downlink beams, a unique SSB is transmitted. Furthermore, the CSI-RS is transmitted in each of the downlink beams; however, these CSI-RSs are not quasi co-located with the SSBs.

As illustrated in each of FIGS. 12 and 13, when the terminal device 100 forms the uplink beam 210, the downlink beam 220 is selected as the best downlink beam. Then, as illustrated in the drawings, the radio resource for the PRACH is associated with the CSI-RS in the selected downlink beam 220. In these drawings, the broken line arrows indicate association of the radio resource for the PRACH.

As illustrated on the right side of FIG. 12, a case is considered in which, when the terminal device 100 has changed the uplink beam to the uplink beam 215, the downlink beam 225 is selected as the best downlink beam. Here, the CSI-RS is newly selected in the selected downlink beam 225. Consequently, the PRACH deciding unit 112 in the terminal device 100 decides that the radio resource associated with the newly selected CSI-RS is the radio resource for the PRACH. Furthermore, because the selected CSI-RS has been changed, the transmission power control unit 114 decides to maintain the transmission power.

Furthermore, as illustrated on the right side of FIG. 13, a case is considered in which, when the terminal device 100 has changed the uplink beam to the uplink beam 215, the downlink beam 220 is continuously selected as the best downlink beam. Here, the same CSI-RS is selected in the selected downlink beam 220. Consequently, the PRACH deciding unit 112 in the terminal device 100 decides that the same radio resource as that used before the change in the uplink beam is the radio resource for the PRACH. Furthermore, because the selected CSI-RS is not changed, the transmission power control unit 114 decides to increase the transmission power.

In this way, even if the CSI-RS is not quasi co-located, it is possible to appropriately control the transmission power of the PRACH associated with the CSI-RS.

Furthermore, in each of the embodiments described above, a description has been given with the assumption that the best downlink beam is selected by the CSI-RS; however, there may be a case in which the best downlink beam is selected by the SSB. In this case, similarly to the first embodiment, the transmission power of the PRACH associated with the SSB may also be increased unless the SSB is changed.

[c] Another Embodiment

Figure 14:
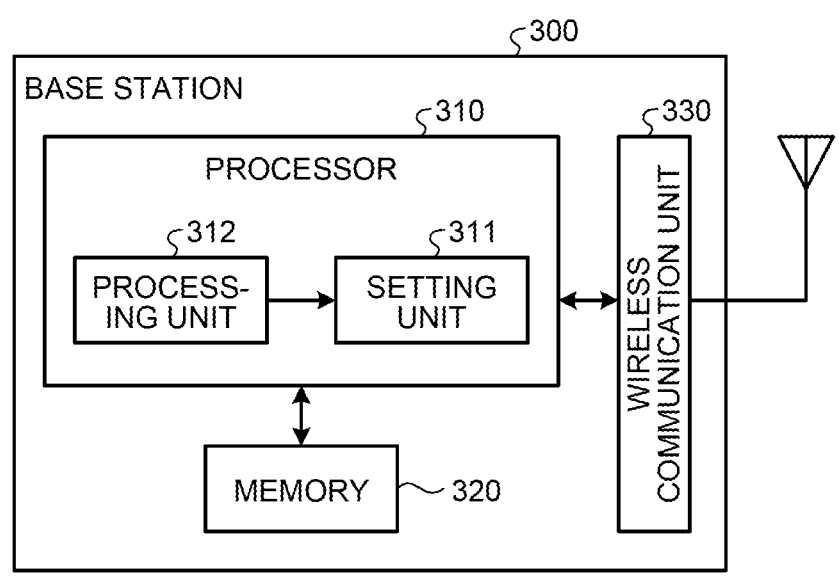
FIG. 14 is a block diagram illustrating a configuration of a base station according to another embodiment.

In another embodiment, an operation of the base station will be described. FIG. 14 is a block diagram illustrating a configuration of a base station 300 according to the other embodiment. Furthermore, the base station 300 illustrated in the other embodiment communicates with the terminal device 100 described in the above embodiments. In short, the other embodiment may also be used in combination with the above embodiments.

The base station 300 illustrated in FIG. 14 includes a processor 310, a memory 320, and a wireless communication unit 330. Furthermore, the "base station" can be reworded into wording of, for example, a communication device, a transmission device, a receiving device, or the like.

The processor 310 includes, for example, a CPU, an FPGA, a DSP, or the like and can control wireless communication. Specifically, the processor 310 includes a setting unit 311 and a processing unit 312.

The setting unit 311 associates the radio resource for the PRACH with a reference signal for estimating a channel state, and can perform control of configuration of association between an SSB and the radio resource for the PRACH and association between the reference signal for estimating the channel state and the SSB.

The processing unit 312 can control the setting unit 311 so as to change the configuration of wireless communication. For example, in a case in which the configuration of wireless communication needs to be changed for handover or the like, the processing unit 312 controls the setting unit 311 to allow the setting unit 311 to change the configuration of association between the reference signal for estimating the channel state and the radio resource for the PRACH, association between the SSB and the radio resource for the PRACH, association between the reference signal for estimating the channel state and the SSB, or the like.

The memory 320 can store therein, for example, information on the terminal device 100 (for example, UE capability), downlink data and uplink data, and the like.

The wireless communication unit 330 performs a predetermined wireless transmission process, such as D/A conversion and up-conversion, on the transmission signal output from the processor 310 and transmits the signal via the antenna. Furthermore, the wireless communication unit 330 receives a signal (for example, a signal related to the random access process (PRACH) or a data signal) via the antenna and can perform a predetermined wireless reception process, such as down-conversion and A/D conversion, on the reception signal.

The base station 300 performs, in the setting unit 211, configuration of association between the reference signal for estimating a channel state and the radio resource for the PRACH and association between the SSB and the radio resource, and transmits an RRC signal including configuration information from the wireless communication unit 330. Furthermore, the wireless communication unit 330 receives, from the terminal device 100, an RRC completion message indicating that, for example, information included in the RRC signal has been configured.

Furthermore, the base station 300 can control the setting unit 311 by using the processing unit 312 so as to change, at the time of handover, the configuration of association between the reference signal for estimating the channel state and the radio resource for the PRACH and association between the SSB and the radio resource. When the setting unit 311 is controlled by the processing unit 312 such that the configuration of association between the reference signal for estimating the channel state and the radio resource for the PRACH and association between the SSB and the radio resource, the setting unit 311 again establishes a configuration of association (namely, changes the configuration).

It is possible to control the transmission power of a preamble in the terminal device 100 by transmitting, in accordance with handover performed in this way, information on association between the reference signal for estimating the channel state and the radio resource for the PRACH and association between the SSB and the radio resource to the terminal device 100.

Furthermore, regarding the content according to each of the embodiments described above, it is possible to update the items of random access preamble transmission described in, for example, Non-Patent Document 22 (TS38.321), to the items illustrated in, for example, FIG. 15.

According to an aspect of the terminal device and the transmission power control method disclosed in the present invention, an advantage is provided in that it is possible to implement appropriate transmission power control.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
   selecting circuitry configured to select a single downlink beam from among a plurality of downlink beams that are used for downlink transmission;
   deciding circuitry configured to:
     select a reference signal for estimating a channel state transmitted by the selected downlink beam, and
     decide that a radio resource associated with a synchronization signal block quasi co-located by the reference signal for estimating the channel state transmitted by the selected downlink beam is a radio resource that is used for a random access process; and
   controller circuitry configured to:
     control transmission power used for the decided radio resource; and
     increase the transmission power in a case in which the synchronization signal block quasi co-located by the reference signal for estimating the channel state of the selected downlink beam is not changed.

2. The terminal device according to claim 1, wherein the controller circuitry maintains the transmission power in a case in which the synchronization signal block associated with the reference signal for estimating the channel state of the selected downlink beam is changed.

3. The terminal device according to claim 1, wherein the controller circuitry increases the transmission power in a case in which, when the radio resource used for the random access process is associated with the reference signal for estimating the channel state, the reference signal for estimating the channel state of the selected downlink beam is not changed.

4. The terminal device according to claim 1, wherein the controller circuitry increases the transmission power in a case in which, when the radio resource used for random access process is associated with the synchronization signal block quasi co-located by the reference signal, the synchronization signal block in the selected downlink beam is not changed.

5. A transmission power control method comprising:
   selecting a single downlink beam from among a plurality of downlink beams that are used for downlink transmission;
   selecting a reference signal for estimating a channel state transmitted by the selected downlink beam;
   deciding that a radio resource associated with a synchronization signal block quasi co-located by the reference signal for estimating the channel state transmitted by the selected downlink beam is a radio resource that is used for a random access process; and controlling transmission power used for the decided radio resource, wherein the controlling includes increasing the transmission power in a case in which the synchronization signal block quasi co-located by the reference signal for estimating the channel state of the selected downlink beam is not changed.

6. A base station comprising:

processor circuitry configured to perform control of association related to a synchronization signal block quasi co-located by a reference signal for estimating a channel state associated with each of a plurality of downlink beams that are used for downlink transmission, the reference signal being selected by a terminal device; and a wireless communicator configured to transmit information related to the association to the terminal device, wherein the wireless communicator receives a signal related to a random access process in a radio resource associated with the reference signal for estimating the channel state of a downlink beam selected by the terminal device, and transmission power of the signal related to the random access process is increased when the synchronization signal block quasi co-located by the reference signal is not changed in accordance with the information.

7. The terminal device according to claim 1, wherein the reference signal is Channel State Information-Reference signal (CSI-RS).

* * * * *